United States Patent [19]
Grosbard

[11] 3,794,391
[45] Feb. 26, 1974

[54] MAGNETIC ROTOR ASSEMBLY
[76] Inventor: Gregory Grosbard, 353 W. 19th St., New York, N.Y.
[22] Filed: Sept. 15, 1972
[21] Appl. No.: 289,361

[52] U.S. Cl. .............................................. 308/10
[51] Int. Cl. .......................................... F16c 39/06
[58] Field of Search ......................... 308/10; 74/5.7

[56] References Cited
UNITED STATES PATENTS
| | | |
|---|---|---|
| 2,582,788 | 1/1952 | Mendelsohn .................... 308/10 |
| 2,725,266 | 11/1955 | Mendelsohn .................... 308/10 |
| 2,747,944 | 5/1956 | Baermann ........................ 308/10 |
| 3,490,816 | 1/1970 | Lyman ............................. 308/10 |
| 3,508,444 | 4/1970 | Sitomer ........................... 308/10 |
| 3,598,456 | 8/1971 | Love ................................ 308/10 |

FOREIGN PATENTS OR APPLICATIONS
1,273,897    9/1961    France ................................ 308/10

*Primary Examiner*—R. Skudy
*Attorney, Agent, or Firm*—Clarence A. O'Brien; Harvey B. Jacobson

[57] ABSTRACT

A rotor assembly having a plurality of magnetic fields extending from radially projecting magnets, the fields being reinforced at the radially inner portion of the rotor by magnetic discs between which the magnets are clamped to create relatively strong repelling forces for floating support of the rotor between rotationally fixed, magnetic suspension members. The radially outer ends of the rotor magnets are of the same polarity.

12 Claims, 5 Drawing Figures

MAGNETIC ROTOR ASSEMBLY

This invention relates to rotor assemblies in general and in particular to a rotor construction having unique magnetic properties suitable for speed regulation, magnetic gear coupling, magnetic drag brake control and other uses.

It is an important object of the present invention to provide a rotor assembly composed of magnetic components with pole faces so arranged as to accommodate anti-friction, rotational support for the rotor assembly as well as to facilitate speed regulation by magnetic drag or magnetic coupling.

In accordance with the present invention, a plurality of radially extending magnets are held assembled in angularly spaced relation to each other between magnetic discs centered by a non-magnetic sleeve on a stationary bearing shaft for rotation thereabout. The radially outer ends of the magnets are of the same polarity so as to induce a fluctuating d.c. current in a stationary coil, for example, while the radially inner ends are of a polarity opposite to the polarity of adjacent axial pole faces of the magnetic discs abutting the magnets. Reinforced magnetic fields are thus produced at the radially inner portion of the rotor assembly to generate repelling forces capable of magnetically suspending the rotor for rotation without axial thrust bearing friction.

These together with other objects and advantages which will become subsequently apparent reside in the details of construction and operation as more fully hereinafter described and claimed, reference being had to the accompanying drawings forming a part hereof, wherein like numerals refer to like parts throughout:

Figure 1:
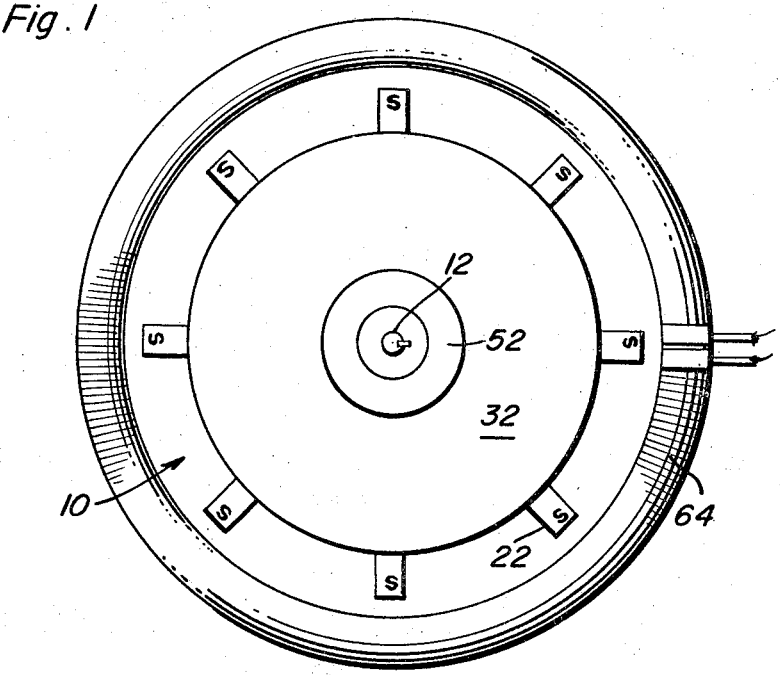
FIG. 1 is a top plan view of a rotor assembly constructed in accordance with the present invention.
Figure 2:
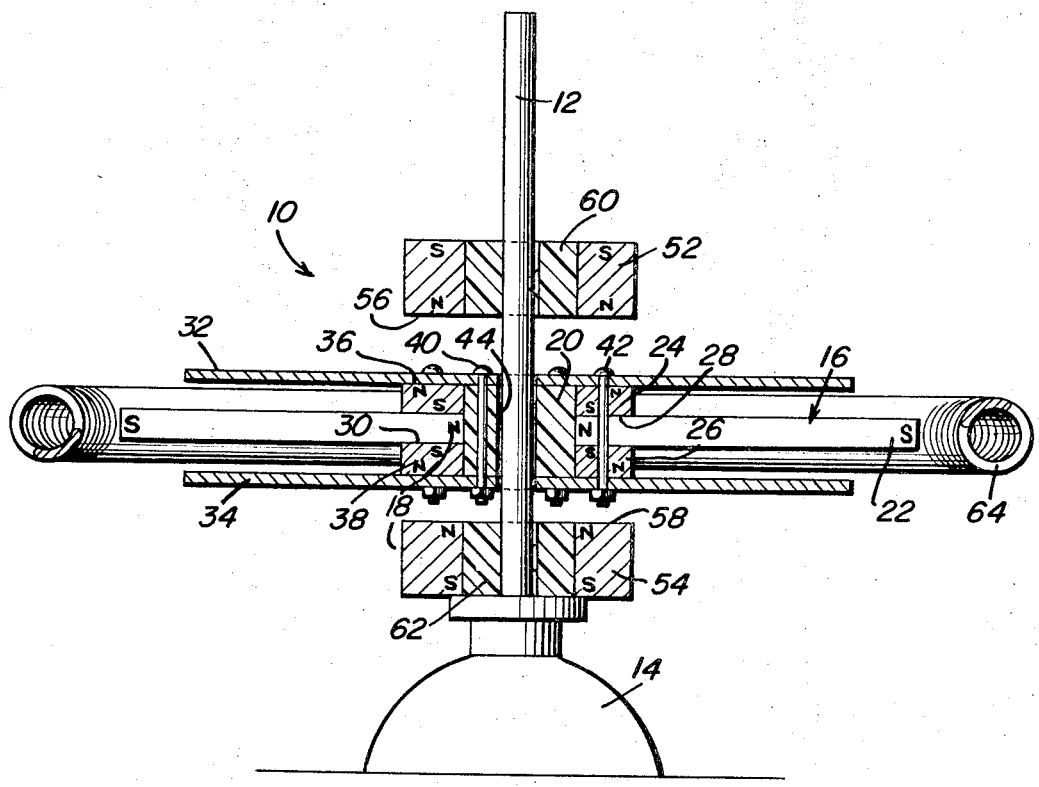
FIG. 2 is a side sectional view of the rotor assembly shown in FIG. 1 magnetically suspended.

Referring now to the drawings in detail, FIGS. 1 and 2 illustrate one embodiment of a rotor assembly generally referred to by reference numeral 10. In the installation shown by way of example, the rotor assembly is rotatable about a vertical rotational axis through an elongated bearing shaft 12 fixed to a base 14. The base and in particular the bearing shaft are made of a nonmagnetic material such as laminated brass.

The rotor assembly 10 in the illustrated embodiment includes a plurality of angularly spaced magnetic elements such as the permanent bar magnets 16 that extend radially from the rotational axis. Each bar magnet has a radially inner pole portion 18 radially spaced from the rotational axis by an abutting sleeve 20 made of a non-magnetic material such as nylon. All of the radially inner pole portions 18 are of the same polarity denoted as north poles (N) in FIG. 2 while the radially outer pole portions 22 are of the same opposite polarity denoted as south (S) poles by way of example.

The bar magnets 16 are clamped in position between a pair of annular magnetic discs 24 and 26 having adjacent axial pole faces 28 and 30 of the same (S) polarity opposite to the (N) polarity of the radially inner pole portions 18 of the magnets 16 in contact therewith. Thin circular plates 32 and 34 made of fiber or copper for example, may be assembled in contact with the axially outer pole faces 36 and 38 of the magnetic discs 24 and 26. Fasteners 40 hold the plates 32 and 34 axially assembled with the sleeve 20 while the fasteners 42 hold the plates axially assembled with the discs 24 and 26 and the bar magnets 16. By placement of weights on the plates 32 and 34, the rotor assembly may be statically and dynamically balanced for rotation on the bearing shaft 12 journaled within the central bore 44 of the sleeve 20 on which the discs, bar magnets and plates are centered.

Figure 3:
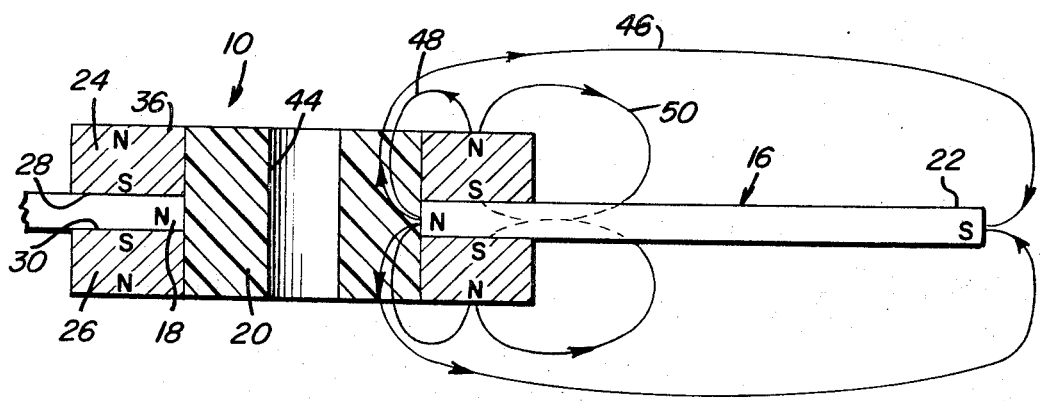
FIG. 3 is a simplified schematic view of the magnetic flux path arrangement associated with the rotor assembly.

As shown in FIG. 3, the magnetic field associated with each bar magnet 16 is characterized by flux paths extending between opposite pole portions 18 and 22. Flux paths 48 and 50 also extend between the opposite pole faces 36 and 38 of disc 24. The flux paths 50 extend radially along the bar magnets 16 a greater distance than the flux paths 48 because portions of paths 50 extend through the low reluctance material of the bar magnets. The flux pattern associated with the magnetic discs 24 and 26 thus cooperates with the magnetic fields of the bar magnets to present high flux density of the same polarity on opposite axial sides of the rotor assembly closer to the radially inner portion thereof. This is useful in exerting sufficiently high repelling forces of opposite directions on the rotor assembly to floatingly support or axially suspend the rotor assembly on the bearing shaft 12 without use of axial thrust bearings.

As shown in FIG. 2, magnetic repelling forces are exerted on the rotor assembly by magnetic suspension means comprising a pair of annular magnetic members 52 and 54 having confronting pole faces 56 and 58 of the same polarity (N) and of the same polarity as the pole faces 36 and 38. The magnetic members 52 and 54 are respectively fixed to non-magnetic nylon bushings 60 and 62 keyed to the bearing shaft for non-rotatable axial sliding movement therealong. Because of the repelling forces generated on opposite axial sides of the rotor assembly, it will be floatingly positioned in axially spaced relation between the annular magnetic member 52 and member 54 resting on the base 14, at a location on the shaft 12 depending on the weight of the rotor assembly. Anti-friction, rotational support is thereby provided.

Figure 4:
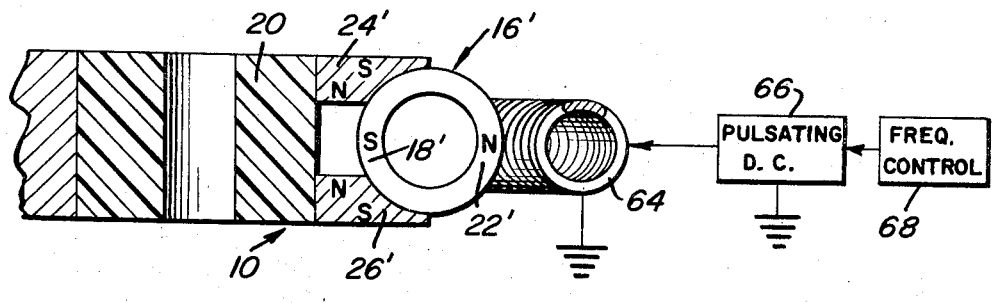
FIG. 4 is a partial side sectional view of a modified form of rotor assembly.

FIG. 4 illustrates a modified rotor assembly 10' in which ring-shaped magnets 16' replace the bar magnets and likewise have radially outer projecting pole portions 22' and radially inner pole portions 18' clamped between magnetic discs 24' and 26' shaped to contact the ring magnets. The discs are centered on the non-magnetic sleeve 20 for rotation. The rotor 10' operates in the same fashion as rotor 10.

As shown in FIGS. 1, 2 and 4, the rotor assembly may be surrounded by a stationary toroidal coil 64 closely positioned in radially spaced relation to the radially outer pole portions 22 of the magnets 16 and in a plane aligned therewith. Thus, rotation of the rotor assembly will induce a fluctuating current in the coil at a frequency dependent on the rotor speed and the number of magnets 16 as the coil wire cuts the magnetic flux of the fields. By applying current of suitable value to the coil from a pulsating source 66 as diagrammatically shown in FIG. 4, rotation of the rotor assembly would be impeded by a bucking magnetic field until the frequency of the currents are the same. Thus, by selecting the frequency of the pulsating source through a suitable control 68, rotation of the rotor may be reduced until its speed is synchronized with the frequency of the source 66. In this manner speed regulation may be provided for the rotor assembly through the magnetic coupling action between the magnets 16 and the stationary coil.

Figure 5:
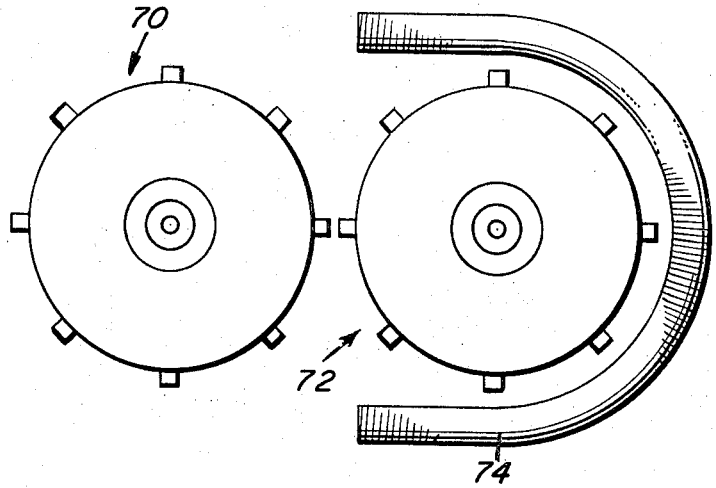
FIG. 5 is a top plan view of a pair of rotor assemblies in a magnetic gear coupling arrangement.

The aforementioned magnetic coupling action may also be utilized between a pair of rotor assemblies 70 and 72 as shown in FIG. 5 so that they may act as meshing gears to transmit rotation without meshing contact. One of the rotors 72 may be the drive gear and its speed regulated by a coil 74 in a manner similar to that described with respect to coil 64. The coil 74 does not, however, surround the driven rotor 70 since its speed would be regulated by rotor 72.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a non-magnetic bearing member through which a rotational axis is established, a rotor assembly comprising a pair of magnetic discs rotationally supported on said bearing member having adjacent axial faces of the same magnetic polarity, a plurality of magnetic elements angularly spaced from each other relative to said rotational axis having radially inner pole portions axially spacing said magnetic discs and radially outer pole portions and means fixedly clamping said discs and elements in assembled relation to each other, said radially inner pole portions of the magnetic elements being of the same polarity and opposite to the polarity of, the adjacent axial faces of the magnetic discs.

2. The combination of claim 1 wherein said clamping means comprises a pair of non-magnetic plates abutting the axial faces of the discs opposite the adjacent faces, a non-magnetic sleeve radially spacing the discs and the elements from the bearing member, said sleeve having a bore within which the bearing member is journaled and fastener means interconnecting the plates with the sleeve and the discs.

3. In combination with the rotor assembly of claim 2, magnetic suspension means slidably mounted on the bearing member for axially positioning the rotor assembly along said rotational axis.

4. The combination of claim 3 wherein said magnetic suspension means comprises a pair of non-magnetic bushings keyed to the bearing member on opposite axial sides of the rotor assembly, and annular magnetic members fixed to said bushings having axial pole faces of the same polarity confronting the opposite axial faces of the magnetic discs of the same polarity.

5. The combination of claim 4 including a toroidal regulating coil positioned in radially spaced relation to the nonmagnetic plates in a plane substantially aligned with the magnetic elements, the radially outer portions of the magnetic elements being of the same polarity and projecting radially beyond the nonmagnetic plates, and means for applying a pulsating current to the coil at a speed regulating frequency.

6. The combination of claim 5 wherein said magnetic elements are ring-shaped.

7. The combination of claim 1, and magnetic suspension means slidably mounted on the bearing member for axially positioning the rotor assembly along said rotational axis.

8. The combination of claim 7 wherein said magnetic suspension means comprises a pair of non-magnetic bushings keyed to the bearing member on opposite axial sides of the rotor assembly, and annular magnetic members fixed to said bushings having axial pole faces of the same polarity confronting the opposite axial faces of the magnetic discs of the same polarity.

9. The combination of claim 2 including a toroidal regulating coil positioned in radially spaced relation to the nonmagnetic plates in a plane substantially aligned with the magnetic elements, the radially outer portions of the magnetic elements being of the same polarity and projecting radially beyond the nonmagnetic plates, and means for applying a pulsating current to the coil at a speed regulating frequency.

10. The combination of claim 1 wherein said magnetic elements are ring-shaped.

11. The combination of claim 1 including a toroidal regulating coil positioned in radially spaced relation to the magnetic elements in a plane substantially aligned therewith, and means for applying a pulsating current to the coil at a speed regulating frequency.

12. In combination, a non-magnetic bearing member and a rotor assembly journaled on the bearing member, comprising a pair of annular magnets having axial pole faces, means rotationally supporting said annular magnets on the bearing member with adjacent ones of said axial pole faces being of the same polarity, and a plurality of angularly spaced magnets axially spacing the adjacent pole faces of said annular magnets and extending radially therefrom, said radially extending magnets having radially outer pole portions of the same polarity as said adjacent axial pole faces of the annular magnets.

* * * * *